United States Patent
Uryu

(10) Patent No.: US 7,298,416 B2
(45) Date of Patent: Nov. 20, 2007

(54) PHOTOGRAPHING APPARATUS CAPABLE OF DATA COMMUNICATION WITH EXTERNAL EQUIPMENT

(75) Inventor: Takeshi Uryu, Hachioji (JP)

(73) Assignee: Konica Corporation, Tokyo (JP)

( * ) Notice: Subject to any disclaimer, the term of this patent is extended or adjusted under 35 U.S.C. 154(b) by 936 days.

(21) Appl. No.: 10/438,711

(22) Filed: May 14, 2003

(65) Prior Publication Data

US 2003/0216089 A1 Nov. 20, 2003

(30) Foreign Application Priority Data

May 20, 2002 (JP) ............................. 2002-144857

(51) Int. Cl.
*H04N 5/225* (2006.01)
(52) U.S. Cl. .................................................... 348/372
(58) Field of Classification Search ................ 348/372, 348/207.2; 713/320, 324; 340/333
See application file for complete search history.

(56) References Cited

U.S. PATENT DOCUMENTS

| | | | | |
|---|---|---|---|---|
| 5,784,581 | A * | 7/1998 | Hannah ....................... | 710/110 |
| 6,233,689 | B1 * | 5/2001 | Allen et al. .................. | 713/320 |
| 6,774,935 | B1 * | 8/2004 | Morimoto et al. ........ | 348/211.5 |
| 6,810,481 | B1 * | 10/2004 | Kawade et al. .............. | 713/300 |
| 6,965,404 | B2 * | 11/2005 | Hosoda et al. ........... | 348/207.2 |
| 2001/0012071 | A1 * | 8/2001 | Oeda et al. .................. | 348/372 |
| 2002/0154224 | A1 * | 10/2002 | Yoneda ................... | 348/211.4 |
| 2003/0030412 | A1 * | 2/2003 | Matsuda et al. ............. | 320/127 |
| 2004/0041913 | A1 * | 3/2004 | Takasumi et al. ........ | 348/207.2 |

* cited by examiner

*Primary Examiner*—Vivek Srivastava
*Assistant Examiner*—Jason Whipkey
(74) *Attorney, Agent, or Firm*—Cohen Pontani Lieberman & Pavane LLP

(57) ABSTRACT

A photographing apparatus is capable of data communication with equipment connected to the photographing apparatus via a communication cable and capable of supplying power to the equipment via the communication cable. The apparatus includes: a connecting section for connecting the communication cable; a connection detecting section for detecting connection of the communication cable to the connecting section; a recognizing section for recognizing that a photographing process is under operation; and a power supply controller for controlling power supply to the communication cable. Wherein, when the connection detecting section has detected that the communication cable is connected to the connection section and the recognizing section has recognized that the photographing process is under operation, the power supply controller controls not to supply power to the communication cable.

25 Claims, 9 Drawing Sheets

PHOTOGRAPHING APPARATUS CAPABLE OF DATA COMMUNICATION WITH EXTERNAL EQUIPMENT

BACKGROUND OF THE INVENTION

The present invention relates to a photographing apparatus connected to another electronic device and power supply method.

1. Prior Art

The USB (Universal Serial Bus) Standard has come into widespread use as an interface standard for communication between a personal computer and its peripheral equipment connected thereto. The USB Standard was worked out by a plurality of business companies and has come to be released to the public. For example when connection is made between a personal computer and a photographing apparatus such as a digital camera according to this USB Standard, the personal computer works as a host machine, while the digital camera as peripheral equipment acts as a slave. The personal computer as a host provides power required for communications between two pieces of equipment.

To supplement the USB Standard, the USB OTG (On The Go) Standard for connection among pieces of peripheral equipment is established. According to the OTG Standard, peripheral equipment working merely as a slave under the USB Standard is provided with the functions of a host. This allows the peripheral equipment to be connected with other peripheral equipment without the aid of a personal computer, whereby communications are established among different pieces of peripheral equipment. For example, when a digital camera is used as peripheral equipment functioning as a host, image data can be transferred to the printer for printing by connection between the digital camera and a printer, the image data can be recorded into the storage apparatus of the PDA by connection between the digital camera and a PDA, or the network can be accessed by connection between the digital camera and cellular phone, so that image data can be sent directly from the digital camera.

When peripheral equipment is connected to another piece of peripheral equipment, one of them functions as a host while the other works as a slave, so power required for communications is supplied from the host to the slave. Accordingly, when the digital camera is used as a host for example, power required for communications is supplied from the digital camera.

2. Problems to be Solved by the Invention

According to the power supply method in a prior art photographing apparatus, however, if a digital camera is used as a host for example, power for communications is continuously supplied to the peripheral equipment throughout the operation of the digital camera even when there is no communication with the connected peripheral equipment. This has led to waste of digital camera power supply. A digital camera normally uses a battery to supply power, and waste of power has raised the problem of an ineffective use of the battery power.

Thus, the object of the present invention is to provide a photographing apparatus that ensures an effective supply of power for communications carried out by connection between pieces of peripheral equipment.

SUMMARY OF THE INVENTION

To achieve the aforementioned object, the present invention provides:

(1) A photographing apparatus capable of data communications with equipment connected via a communications cable and supplying power thereto, this photographing apparatus comprising:

a connecting section for connecting a communications cable;

connection detecting means for detecting connection of the aforementioned communications cable with the connecting section;

identification means for identifying photographing operation currently being performed; and power supply control means for making control in such a way that power is not supplied to the communications cable when the aforementioned connection detecting means has detected that the communications cable is connected, and the aforementioned identification means has identified photographing operation currently being performed.

(2) A photographing apparatus capable of data communications with equipment connected via a communications cable and supplying power thereto, this photographing apparatus comprising:

a connecting section for connecting a communications cable;

setting means for setting a mode by selecting from a mode group consisting of at least a camera mode for photographing operation and a communications mode for performing operations related to data communications with the aforementioned equipment; and power supply control means for supplying power to the communications cable when the communications mode has been set up by the aforementioned setting means.

(3) A photographing apparatus capable of data communications with equipment connected via a communications cable and supplying power thereto, the aforementioned photographing apparatus further capable of functioning as a host or slave with respect to this equipment, wherein this photographing apparatus comprises;

first connecting means for connecting the communications cable when this photographing apparatus functions as a host with respect to the aforementioned equipment;

second connecting means for connecting the communications cable when this photographing apparatus functions as a slave with respect to the aforementioned equipment;

connection detecting means for detecting connection of the aforementioned communications cable with either the first or second connecting means; and power supply control means for supplying power to the communications cable when the connection detecting means has detected connection of the communications cable with the first connecting means.

(4) A photographing apparatus capable of data communications with equipment connected via a communications cable and supplying power thereto, this photographing apparatus comprising:

a connecting section for connecting a communications cable;

state checking means for confirming connection of the communications cable to the connecting section and checking if at least a driver is built in connected equipment and if the power consumption of the connected equipment exceeds a predetermined value; and warning output means for issuing a warning when the aforementioned state checking means has checked that a driver is not built in the connected equipment, or the power consumption of the connected equipment is not less than a predetermined value.

(5) A photographing apparatus capable of data communications with equipment connected via a communications cable and supplying power thereto, this photographing apparatus comprising:

a connecting section for connecting a communications cable;

state checking means for detecting connection of the communications cable to the connecting section and checking that the connected equipment is enabled; and warning output means for issuing a warning when the aforementioned state checking means has checked that the connected equipment is not enabled.

DETAILED DESCRIPTION OF THE PREFERRED EMBODIMENT

Figure 1:
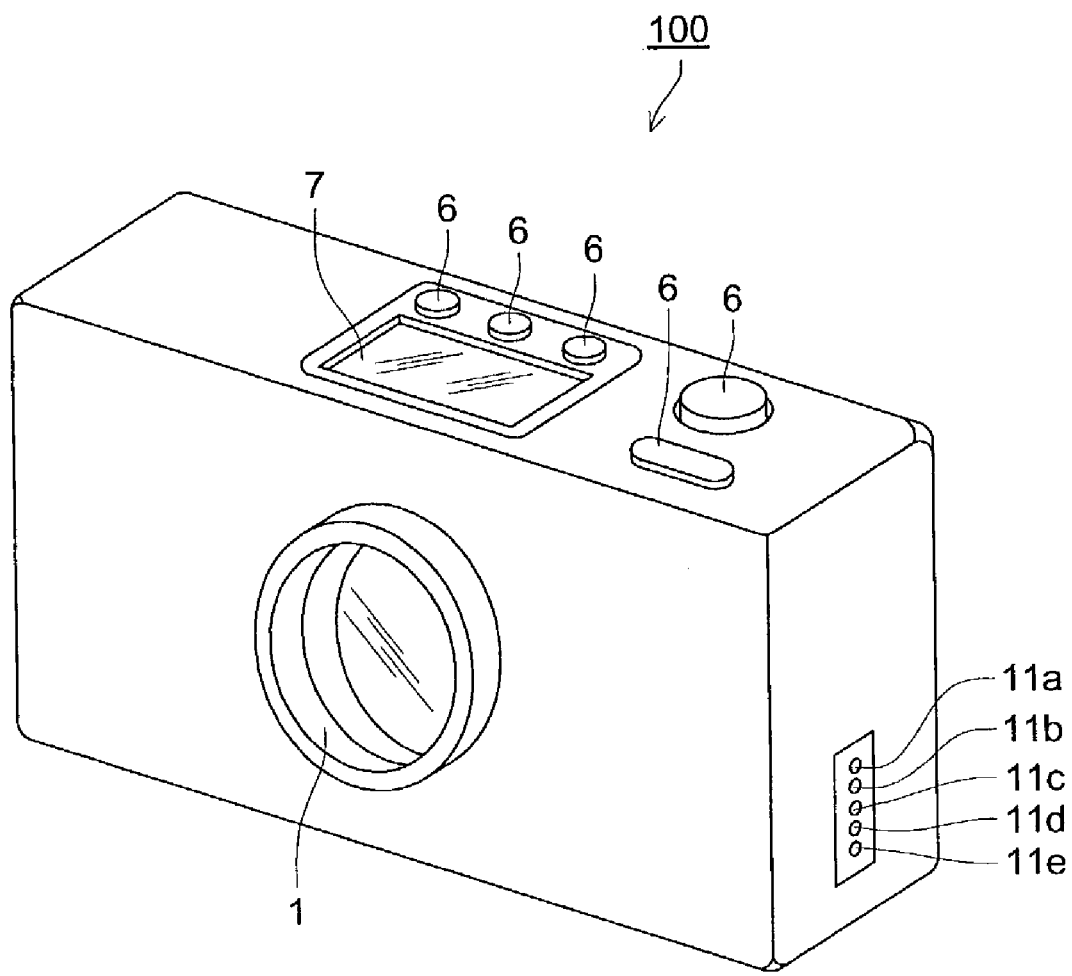
FIG. 1 is a drawing representing an external configuration of a digital camera 100 as a first embodiment of the present invention.

The following describes the details of the preferred embodiments of the present invention with reference to the drawings. It should be noted, however, that the scope of the invention is not limited to the illustrated examples. The following descriptions on the first to third embodiments are based on the assumption that the photographing apparatus according to the present invention is a digital camera.

The following shows the correspondence between the photographing apparatus according to the present invention and the components of the digital cameras 100 to 300 in the present embodiment: The identification means, power supply control means, display control means, communications identification means, communications control means, battery remaining time detecting means, control means, warning output means, state checking means and identification means according to the present invention are controlled by the control section 3 mounted digital cameras 100 to 300 in the first to third embodiments. The function of the connection detecting means according to the present invention is realized by the OTG connector 11 of the digital cameras 100 and 200 or the host connector 12 and slave connector of the digital camera 300. The first connecting means according to the present invention corresponds to the host connector 12 of the digital camera 300, and second connecting means corresponds to the slave connector 13. The display means of the present invention corresponds to a display section 7 of the present embodiment, and the setting means of the present invention corresponds to a selector switch 6a of the present embodiment. The mode setting means of the present invention corresponds to the selector switch 6b of the present embodiment.

First Embodiment

The following shows the configuration:

FIG. 1 is a perspective view representing an external configuration of a digital camera 100 as the first embodiment. As shown in FIG. 1, a power key, shutter key and various selector keys are arranged as input units 6 on the top surface of the digital camera 100. Further, a data display unit is arranged as display units 7 thereon. A lens 1 is arranged at the center of the front. On the side there is an OTG 11 provided with five terminals 11a through 11 for connection of the communications cable for communications with peripheral equipment (hereinafter abbreviated as "the equipment"). The details of the function of each of the terminals 11a through 11e will be given later.

Figure 2:
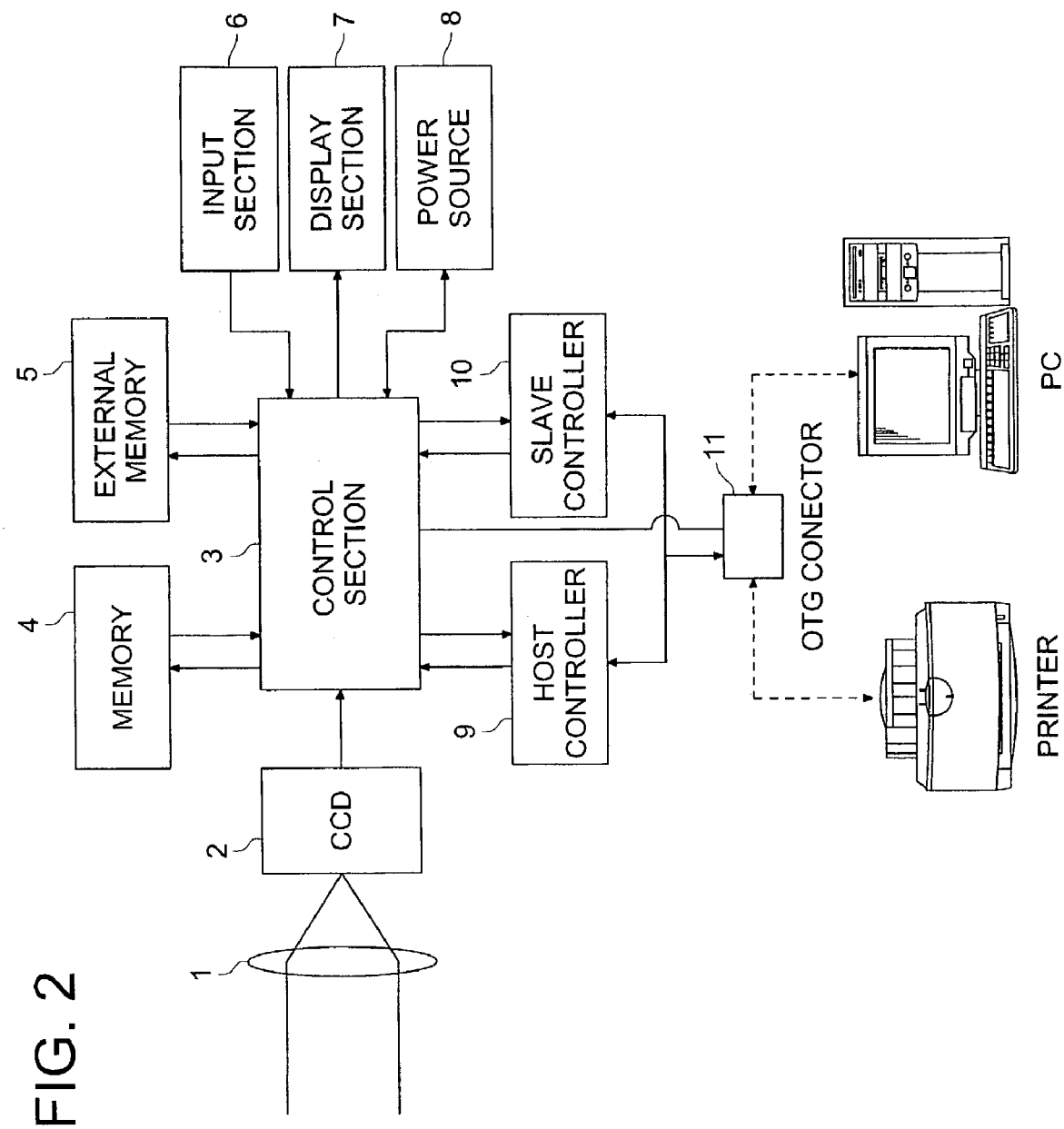
FIG. 2 is a block diagram representing the configuration of the major portions of the digital camera 100 given in FIG. 1.

FIG. 2 is a block diagram representing the configuration of the major portions of the digital camera 100. As shown in FIG. 2, the digital camera 100 comprises a lens 1, CCD 2, control section 3, memory 4, external memory 5, input section 6, display section 7, power source 8, host controller 9 and slave controller 10, OTG connector 11 and other components.

The lens 1 comprises a fixed-focal-length lens using a dioptric element, a double focal lens allowing focal distance to be switched in two stages and a zoom lens allowing continuous change of the focal distance. This lens 1 permits convergence of the pencil of light rays entering from the outside, and allows an optical image to be formed on the light receiving unit of the CCD2 to be described later.

The CCD (Charge Coupled equipment) comprises a pixel surface where multiple elements (pixels) composed of transfer electrodes stacked in layers are arranged in a planar form on the light receiving unit of the semiconductor element (photodiode, etc.) with its electric storage capacity changed in conformity to the entry of light (photon), and an output unit for changing the electric charge stored in each pixel into voltage and outputting it. The light incoming through the lens 1 is received on the aforementioned pixel surface and the electric charges proportional to the amount of received light is stored. The electric charge stored in each pixel is read out from the output unit as a pickup signal (analog signal) sequentially for each pixel, and is converted into image data (digital data) in an A/D converter (not illustrated) to be issued from the control section 3.

The control section 3 develops in the work area of a memory 4 a program specified out of various programs corresponding to the digital camera 100 recorded in the memory 4, and various instructions or data entered from the input section 6. The control section 3 implements processing of various kinds in conformity to the aforementioned program according to the entered instruction and data, stores the result of processing in a predetermined area inside the memory 4, and displays it on the display section 7.

To put it more specifically, the control section 3 reads out the power supply processing program stored in the memory 4 and carries out the processing of power supply (see FIG. 4) to be described later. When carrying out the processing of power supply, the control section 3 checks if photographing operation is currently performed or not, if the OTG connector 11 has detected connection of the communications cable 20 to perform communications with peripheral equipment. Here "the photographing operation" should be interpreted to mean the operations related to photographing such as zoom lens drive, photographing of a subject, image processing, charging of a stroboscopic lamp, AE (Automatic Exposure), AF (Automatic Focusing) and recording of data onto a recording medium. But it does not include the operation of showing an image or the like on display.

Having determined that the photographing operation is currently performed, the control section 3 provides control in such a way that power is not supplied to the connected communications cable 20. If it has determined that the photographing operation is not currently performed, the control section 3 checks if image data is displayed on the display section 7 or not. If the image data is displayed, the control section 3 provides control in such a way that power is supplied to the connected communications cable 20. At the same time, it allows the image data to be shown on the display section 7.

The memory 4 comprises a RAM (Random Access Memory) composed of a rewritable semiconductor element, a ROM (Read Only Memory) composed of a nonvolatile semiconductor memory and the like. Of various control programs for controlling each section of the digital camera 100, the basic programs that need not be rewritten are stored in the ROM. When various types of control are processed by the control section 3, the RAM develops the program responsible for control processing and temporarily stores the data to be processed.

The external memory 5 comprises such a nonvolatile memory as rewritable flash memory that electronically stores the data in the semiconductor equipment, and associates and stores the image data generated by various types of processing and information related to photographing. The external memory 5 is shown as an external memory that is removably mounted on the digital camera 100, but it can be configured as a memory that can be built in the digital camera 100.

The input section 6 comprises a power key, a shutter key, a selector key, a zoom key and others. It generates various operation signals in conformity to the operation of pressing each key, and sends them to the control section 3.

The display section 7 composes a color liquid crystal display and others. It comprises a liquid crystal display and an image display unit for displaying color images on the display screen based on the image signal entering from the control section 3. It also comprises a data display unit that generates and displays the information to be displayed according to the control signal coming from the control section 3.

The power source 8 comprises a primary battery such as an alkali battery, manganese battery and button battery, and a secondary battery such as a lithium battery, nickel battery and NiCad battery. In response the control operation of the control section 3, the power supply unit 8 supplies power of a predetermined voltage to the drive circuit for driving various parts of the digital camera 100 and communications cable 20 from the positive and negative terminals.

When the digital camera 100 works as a host, the host controller 9 provides communications control of the signals input or output through the OTG connector 11 for the spraying equipment of a printer, PDA or cellular phone, for example. The host controller 9 has functions of providing multiple types of communications procedures (data transmission speed, data compression procedure, error detection procedure, etc.). Prior to communications, it checks the communications procedure supported by the other end, and adopts the optimum communications procedure to provide communications control.

When a digital camera 100 works as a slave, the slave controller 10 provides communications control of the signals input or output through the OTG connector 11 for host equipment such as power consumption, for example. The slave controller 10 has functions of providing multiple types of communications procedures. Prior to communications, it checks the communications procedure supported by the other end, and adopts the optimum communications procedure to provide communications control.

The OTG connector 11 is provided with a V-BUS terminal 11a as a power supply output terminal, a D+terminal 11b and a D−terminal 11c as signal input/output terminals, a GND terminal 11d for grounding, and an identification terminal 11e for checking if the equipment at the other end is a host or slave. Upon detecting the connection of communications cable 20, the OTG connector 11 sends a connection detection signal to the control section 3. It also inputs and/or outputs the signals coming via the D+terminal and/or D−terminal from or to the slave controller 9. In response to the control of the host controller 9, it also provides power for communications from the V-BUS terminal.

Figure 3:
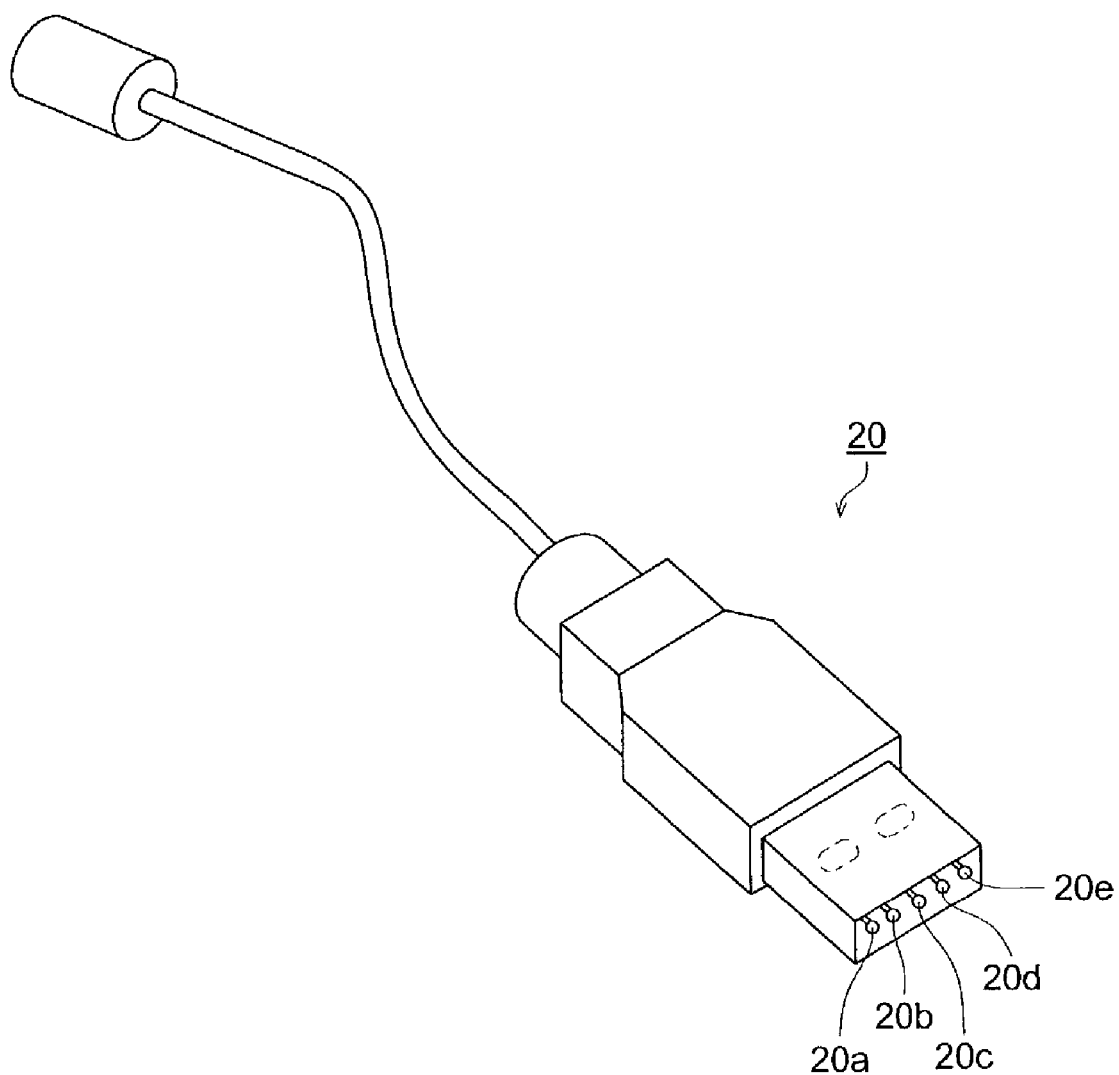
FIG. 3 is a drawing representing the external configuration of a communications cable 20 connected to an OTG connector 11 in FIG. 1.

FIG. 3 is a drawing representing the external configuration of the communications cable 20 connected to the OTG connector 11. A connector is arranged on each side of the communications cable 20. These connectors are linked to the OTG connector 11 and the connector of the peripheral equipment, respectively. The connector linked to the OTG connector 11 is provided with a V-BUS terminal 20a as a power input terminal, D+20b and D−20c as signal input/output terminals, a GND terminal 20d for grounding and an identification terminal 20e, correspondingly to the aforementioned terminals 11a through 11e respectively.

The following shows the operation of the present embodiment:

The following description is based on the assumption that the program for processing described in the following flow chart is stored in the memory 4 in the form of a program code that can be read by the control section 3 of the digital camera 100, and the control section 3 sequentially performs the operations in response to the program code.

Figure 4:
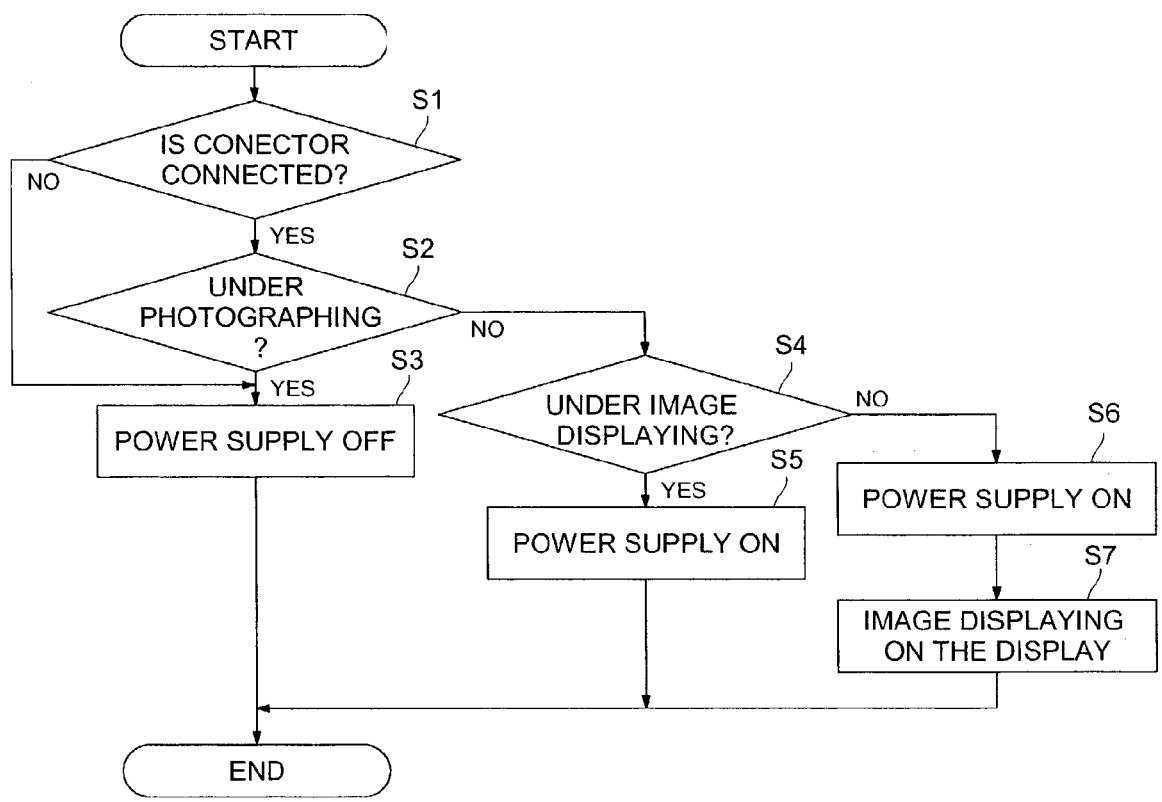
FIG. 4 is a flow chart representing the processing of power supply carried out by the control section 3.

FIG. 4 is a flow chart representing the processing of power supply carried out by the control section 3 of the digital camera 100. As shown in FIG. 4, a connection detection signal is sent to the control section 3 from the OTG connector 11. Upon detecting the connection of the communications cable 20 (Step S1; YES), decision is made to see if the photographing operation is performed or not (Step 2). When the photographing operation is performed (Step S2), the control section 3 provides control in such a way that power is not supplied to the communications cable 20 (Step S3), and terminates the processing of power supply.

When the photographing operation is not performed (Step S2; NO), the control section 3 checks if an image is being displayed or not (Step 4). If it is currently being displayed (Step S4; YES), the control section 3 provides control in such a way that power is supplied to the communications cable 20, and terminates the processing of power supply. Further, if an image is not being displayed (Step 4; NO), the control section 3 provides control in such a way that power is supplied to the communications cable 20 (Step S6). It also allows image data to be displayed on the display section 7 (Step S7), and terminates the processing of power supply.

According to the first embodiment, when the digital camera 100 comprising a host function is connected with peripheral equipment through a communications cable 20 to transfer data between them, detection is made to check that the communications cable 20 for connection with the peripheral equipment is connected. If the digital camera 100 is currently in the mode of photographing operation, power is not supplied to the communications cable 20. If the digital camera 100 is not in the mode of photographing operation, power is supplied to the communications cable 20, and, at the same time, image data is displayed on the display section 7.

Accordingly, when the digital camera 100 as a host is connected to peripheral equipment, power is not supplied to the communications cable 20 in the photographing operation mode where data communication is not performed, thereby ensuring an effective use of the power of the digital camera 100 and reducing the power for communications. Further, before the start of data communication with peripheral equipment, the image data to be sent is displayed on the display section 7. This allows the user to perform data communications while checking the image data on the display section 7, with the result that the convenience of custom is greatly improved.

The operation of the digital camera 100 given in the aforementioned processing of power supply is only an example, and should not be considered as being restricted thereto. For example, the first embodiment is arranged in such a way that power is supplied to the communications cable 20 if the connection of the communications cable 20 is detected while an image appears on the display. Without being restricted to this arrangement, however, it is possible to make arrangement in such a way that power is not supplied when connection of the communications cable 20 has been detected with an image appearing on the display, and is supplied when the instruction has been entered to print out the image appearing on the display section 7. Namely, when the print button has been pressed to enter the printing instruction while an image is displayed, the digital camera 100 supplies power to the communications cable 20 to which the printer is connected. At the same time, the displayed image data to be printed is sent to a printer through the communications cable 20, and is printed out by the printer. This allows the power for communications to be supplied immediately when communications start instruction is entered, and eliminates the waste of power, thereby making a significant contribution to power saving of the digital camera 100.

Second Embodiment

The following describes the second embodiment of the present invention:

The digital camera 200 in the second embodiment is arranged in almost the same configuration as the digital camera 100 in the first embodiment. The portions having the same configuration as those of the first embodiment will be assigned with the same reference numerals in the drawings. They will not be described to avoid duplication.

Figure 5:
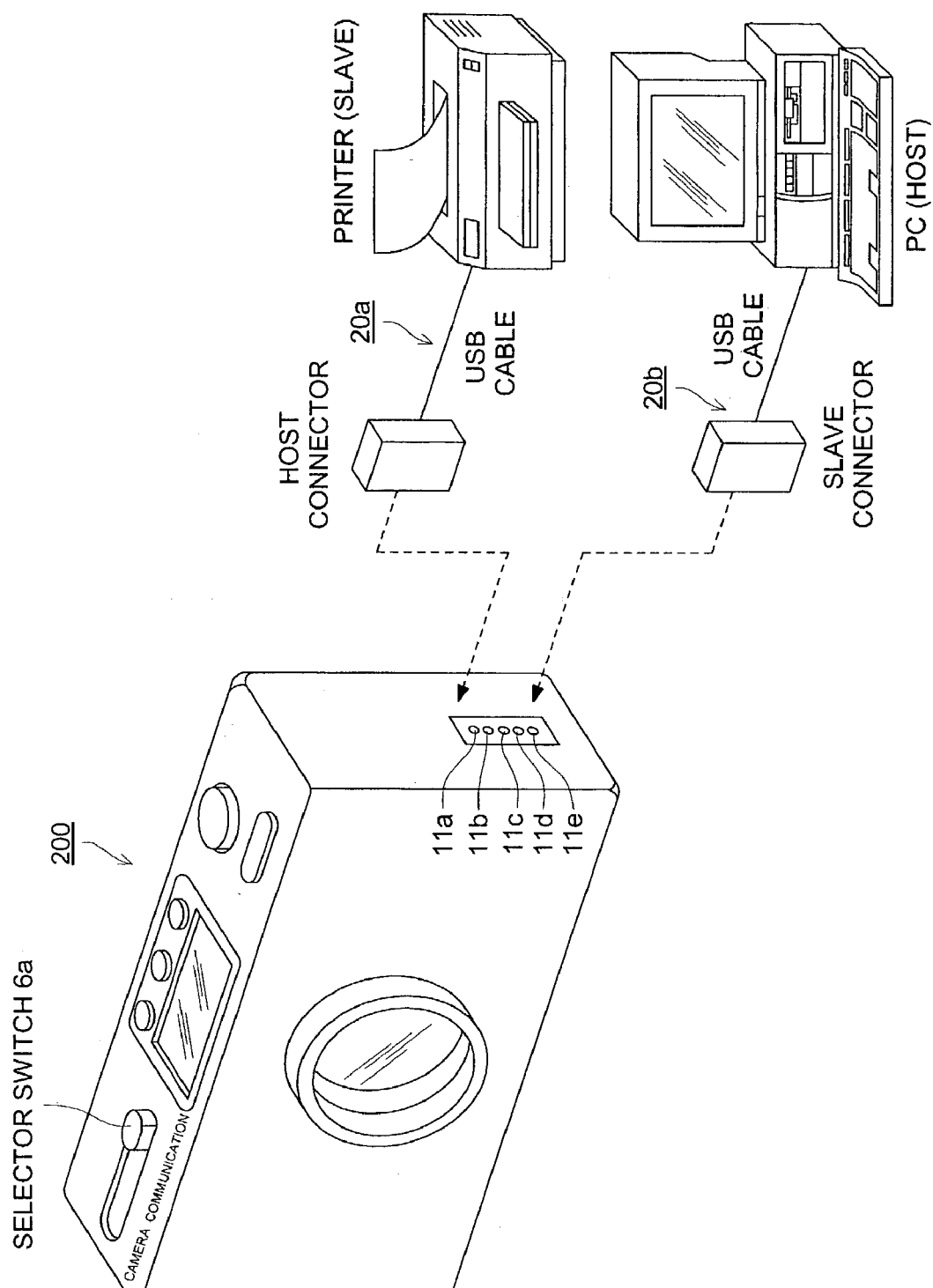
FIG. 5 is a drawing representing the external configuration of the digital camera 200 as a second embodiment.

In the first place the following describes the configuration:

FIG. 5 is a drawing representing the external configuration of the digital camera 200. As shown in FIG. 5, the digital camera 200 consists of a digital camera 100, plus a selector switch 6a for selecting the communications mode or camera mode. Either the communications mode or camera mode can be selected by selecting this selector switch 6a to a predetermined position and locking it thereon, whereby photographing processing or communications processing can be performed.

When the equipment to be connected is a slave, i.e. when the digital camera 200 works as a host, the peripheral equipment linked to the OTG connector 11 has a host connector that is electrically linked to the identification terminal 11e of the OTG connector 11. When the equipment to be connected is a host i.e. when the digital camera 200 works as a slave, the equipment to be connected has a slave connector that is not electrically linked to the identification terminal 11e of the OTG connector 11.

In other words, the OTG connector 11 sends to the control section 3 the connection detection signal containing the information on the presence or absence of the identification terminal 11e. Depending on the connection state of the identification terminal 11e, the control section 3 checks if the host function or slave function is requested. In the following description, "communications cable 20a" signifies a communications cable to be connected when the digital camera 200 works as a host, while "communications cable 20b" signifies a communications cable to be connected when the digital camera 200 works as a slave. "Communications cable 20" means either one of them.

Further, the control section 3 performs processing of power supply 2 (See FIG. 6) to be described later as the processing characteristic of the second embodiment. When performing processing of power supply 2, the control section 3 checks whether or not the connected peripheral equipment requires the host function in response to the connection state of the identification terminal 11e, if connection of the communications cable 20 has been detected by the OTG connector 11 when the communications mode is selected by the selector switch 6. If the connected peripheral equipment requires the host function, i.e. when the peripheral equipment is a slave with a host connector linked thereto, the control section 3 functions as a host and supplies power to the communications cable 20a.

When the control section 3 has started to supply power to the communications cable 20a, it conducts negotiation to be predetermined through exchange of information on communications conditions, etc. between the connected pieces of equipment and checks whether or not the connected equipment is enabled for communications. Here the connected equipment is not enabled for communications in the following cases where; (1) the connected equipment is a mouse, keyboard or the like not equipped with a driver, (2) the power consumption of the equipment exceeds the predetermined level, or (3) the connected equipment is disabled by a trouble or power interruption. If the connected equipment is not enabled for communications, the control section 3 allows an alarm such as an error message to be displayed on the display section 7, and turns off the power of the digital camera 200 after the lapse of a predetermined time.

If the connected equipment is enabled for communication, the control section 3 further checks whether or not the connected equipment is a printer. If it is a printer, the image data is shown on the display section 7 prior to starting communications.

Figure 6:
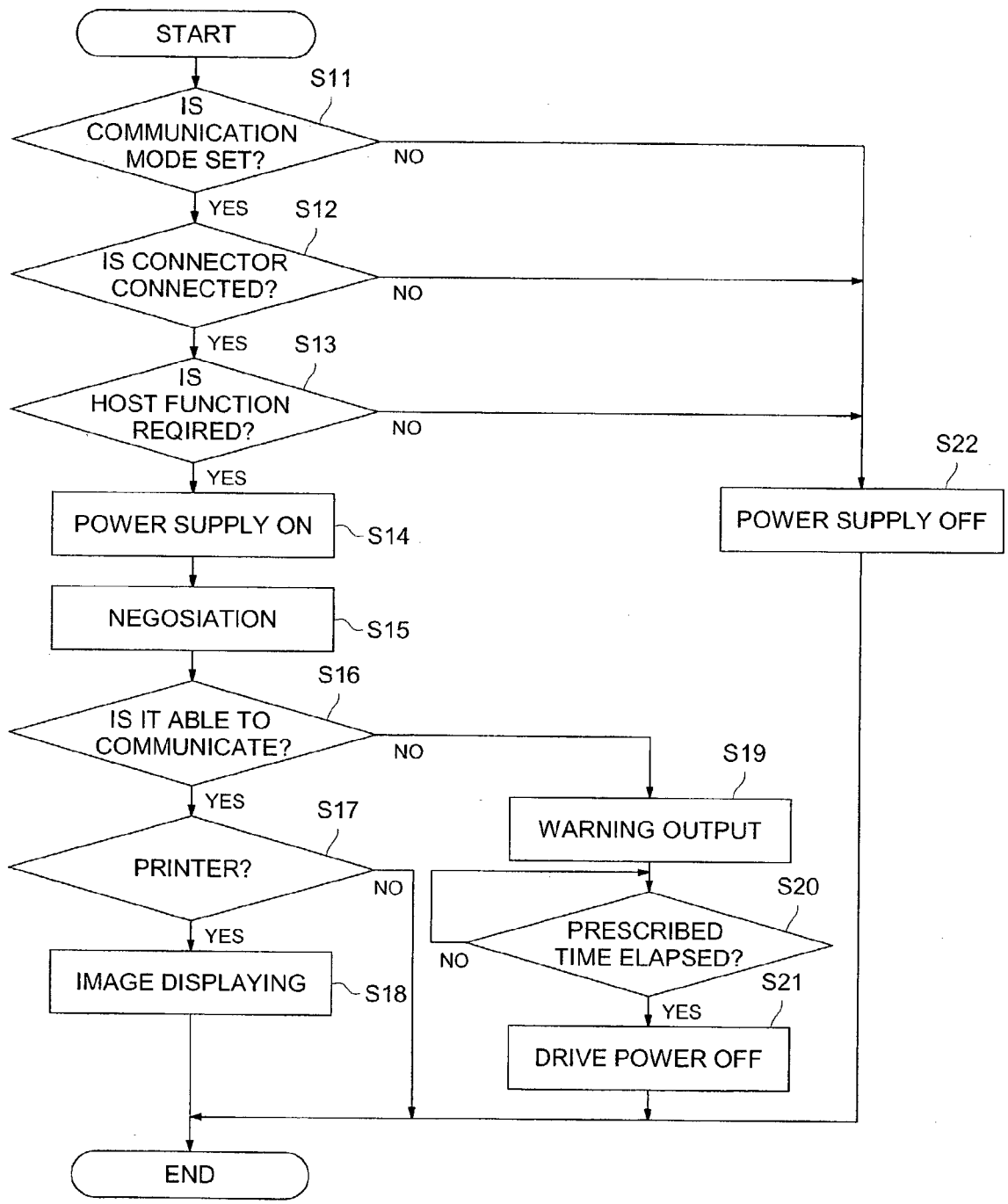
FIG. 6 is a flow chart representing power supply processing 2 carried out by a control section 3 in the second embodiment.

The following describes the operation of the present second embodiment:

FIG. 6 is a flow chart representing power supply processing 2 carried out by the control section 3 of the digital camera 200. As shown in FIG. 6, the control section 3 checks whether or not the communications mode is selected by the selector switch 6aa (Step S11). If the communication mode is selected (Step S11; YES), it checks whether or not the connection has been detected by the OTG connector 11 (Step S12).

When the connection of the communications cable 20 has been detected by the OTG connector 11 (Step S12; YES), the control section 3 checks whether or not the host function is requested, depending on the connection state of the identification terminal 11e. If the host function is requested (Step S13; YES), i.e. if the connected equipment is a slave, the control section 3 controls the power supply unit 8 to supply power to the communications cable 20a (Step S14) and starts negotiation with the connected equipment (Step S15).

Then the control section 3 checks whether or not the connected equipment is enabled for communication by negotiation (Step S16). If the connected equipment is enabled for communications (Step S16; YE), the control section 3 checks whether or not this equipment is a printer (Step S17). If the equipment is not a printer (Step S17; NO), it terminates the processing of power supply 2. If the equipment is a printer (Step S17; YES), the control section 3 allows the image data to be displayed on the display section 7 (Step S18), and terminates the processing of power supply 2.

If the connected equipment is not enabled for communications (Step S16; NO), the control section 3 allows the warning to be displayed on the display section 7 (Step S19). A predetermined time after display of the warning (Step S20; YES), the drive power of the digital camera 100 is turned off (Step S21) and the processing of power supply 2 terminates.

Further, if the communications mode is not selected (Step S11; NO), the communications cable 20 is not connected to the OTG connector 11 (Step S12; NO) or host function is not requested from the connected equipment (Step S13; NO), then the control section 3 terminates the processing of power supply 2 without supplying power to the communications cable 20.

As described above, in the second embodiment the digital camera 200 comprises a selector switch 6a for selecting either the communications mode for communications processing or camera mode for photographing. When the communications mode is selected, the communications cable 20 is connected to the OTG connector 11 and the host function is requested, then power is supplied to the connected communications cable 20.

Thus, only when enabled for communications with the connected equipment, power is supplied to the communications cable 20 to perform communication. This approach eliminates unnecessary power supply and minimizes power consumption of the digital camera 200.

Negotiation is conducted with the connected equipment. Power supply is continued if the connected equipment is enabled for communications. If the connected equipment is enabled for communications and is a printer, power supply is continued, and at the same time, image data is displayed on the display section 7. Then the image data exchanged between pieces of equipment can be shown on the display section 7 prior to starting communications. This allows the user to check the image data easily, with the result that the convenience of the user is greatly improved.

If the connected equipment is not enabled for communications, a warning message is given on the display section 7 and the drive power of the digital camera 100 is turned off after the lapse of a predetermined time. When the connected equipment is not enabled for communications, this arrangement calls attention of the user in such a way as to ensure immediate disconnection or immediate recover of the connected equipment, thereby permitting immediate solution of the trouble.

When the communications mode is not selected, the communications cable 20 is not selected to OTG connector 11 or a host function is not requested, then the control section 3 does not allow power to be sent to the communications cable 20. If power supply is not required, this arrangement stops supply of power from the digital camera 200, thereby ensuring an effective use of the power of the digital camera 200 and reducing the power.

Third Embodiment

The following describes the third embodiment of the present invention:

The digital camera 300 in the third embodiment is arranged in almost the same configuration as the digital camera 100 in the first embodiment. The portions having the same configuration as those of the first embodiment will be assigned with the same reference numerals in the drawings. They will not be described to avoid duplication.

The configuration will be shown in the first place.

Figure 7:
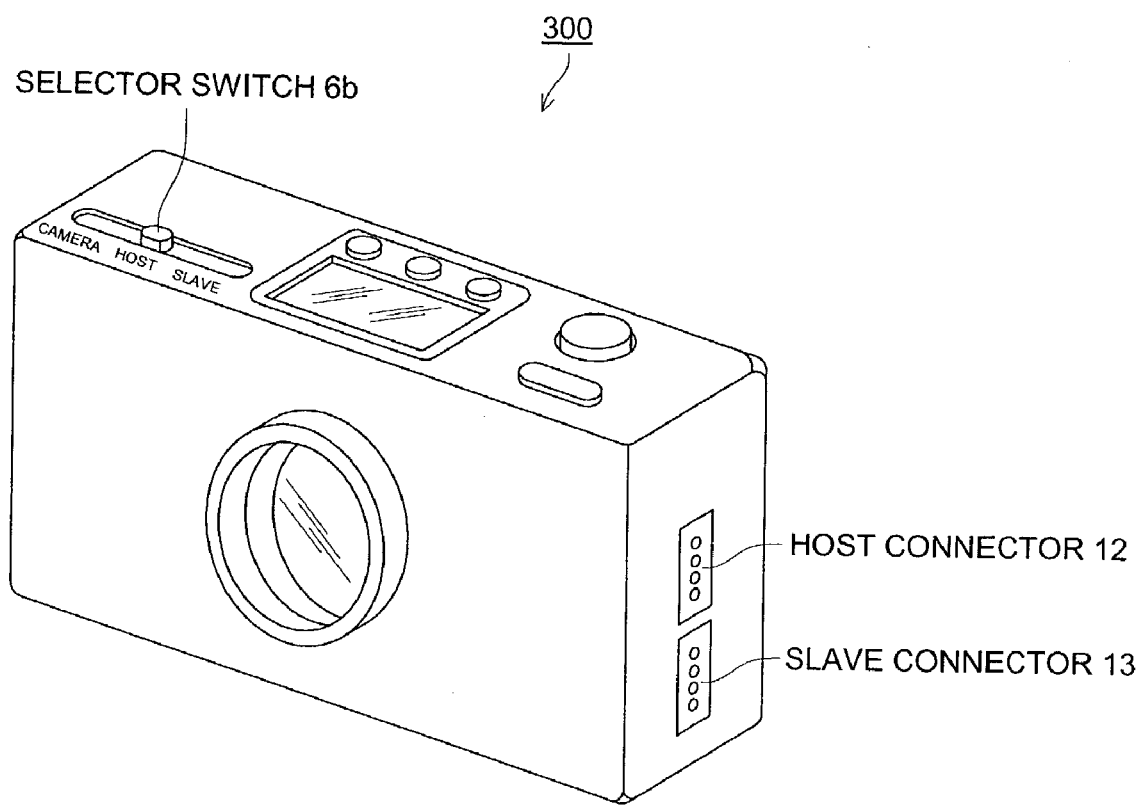
FIG. 7 is a drawing representing the external configuration of the digital camera 300 as a third embodiment.

FIG. 7 is a drawing representing the external configuration of the digital camera 300. As shown in FIG. 7, the digital camera 300 consists of a digital camera 100, plus a selector switch 6b for selecting the camera mode, host mode or slave mode. Any one of the camera mode, host mode and slave mode can be selected by selecting this selector switch 6b to a predetermined position and locking it thereon, whereby photographing processing or communications processing can be performed.

The digital camera 300 further comprises a host connector 12 and slave connector 13. The communications cable 20 can be connected either to the host connector 12 or slave connector 13 in conformity to the function requested by the connected equipment. Accordingly, the host connector 12 and slave connector 13 without the aforementioned identification terminal 11e are provided with four terminals; a V-BUS terminal 11a as a power output terminal, a D+terminal 11b and a D−terminal 11c as signal input/output terminals, and a GND terminal 11d for grounding.

Figure 8:
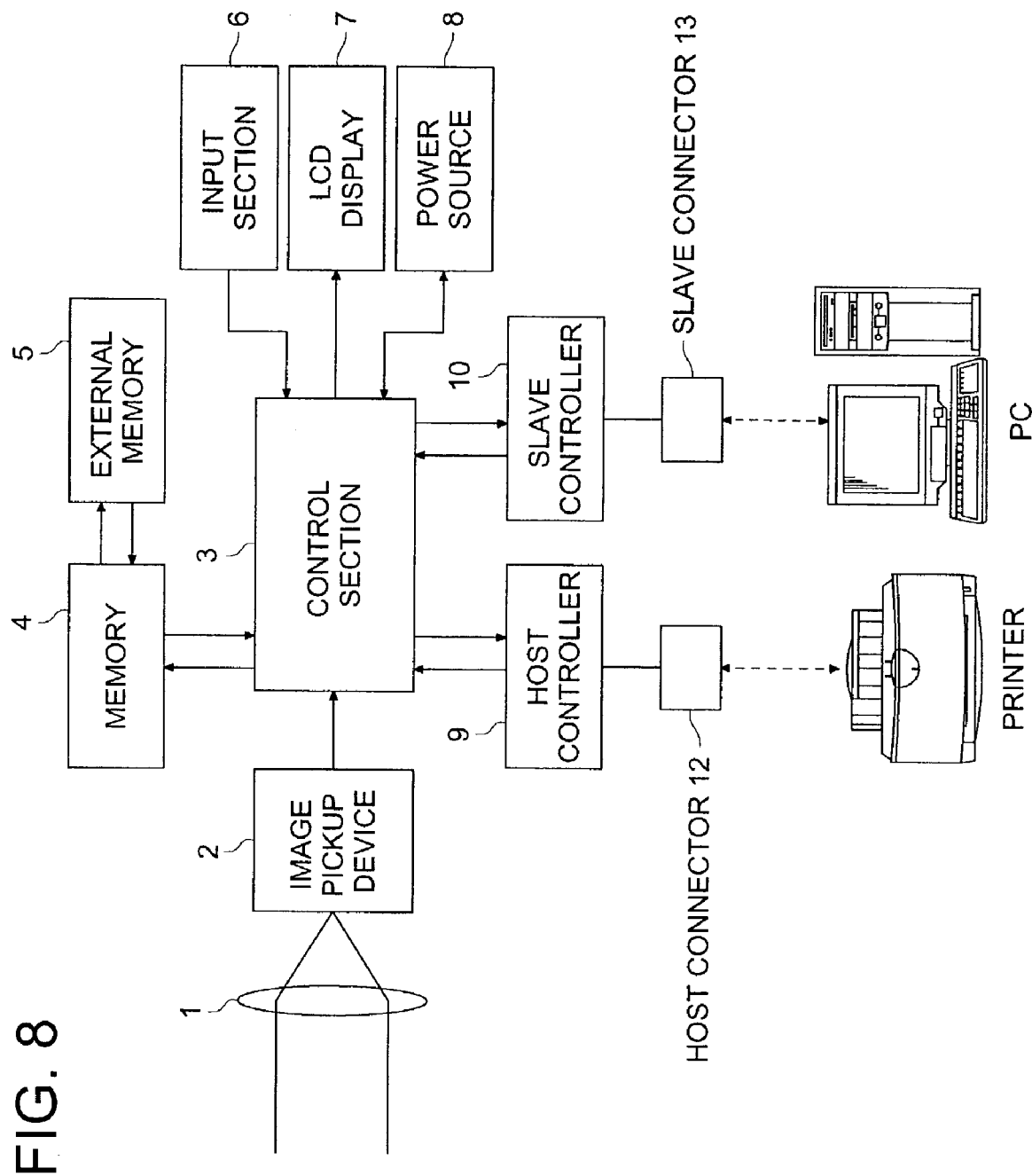
FIG. 8 is a block diagram representing the configuration of the major portions of the digital camera 300 given in FIG. 7.

FIG. 8 is a block diagram representing the configuration of the major portions of the digital camera 300.

The following describes only the configuration characteristic of the third embodiment: The digital camera 300 is characterized by comprising a host connector 12 and a slave connector 13. The host connector 12 is used when the digital camera 300 works as a host. When connection of the communications cable 20 has been detected, a detection signal is sent to the host controller to show that the slave equipment has been connected. The slave connector 13 is used when the digital camera 300 works as a slave. When connection of the communications cable 20 has been detected, a detection signal is sent to the slave controller to show that the host equipment has been connected.

The control section 3 performs processing of power supply 3 (See FIG. 9) to be described later as the processing characteristic of the third embodiment. When performing processing of power supply 3, the control section 3 determines the mode selected on the mode selector switch 6b. If the camera mode is selected on the selector switch 6b, the control section 3 checks if photographing operation is currently performed or not. If photographing operation is currently performed, the control section 3 provides control in such a way that power is not supplied to the communications cable 20 even if connection of the host connector 12 and slave connector 13 has been detected. When the camera mode is selected and the image data is shown on the display section 7, the control section 3 assumes that the operation other than photographing operation is performed. When the connection of the host connector 12 has been detected, the control section 3 provides control to ensure that power is supplied to the communications cable 20a.

If the host mode is selected, the control section 3 checks if the communications cable 20a has been connected to the host connector 12 or not. If connection of the host connector 12 has been detected, the control section 3 provides control to ensure that power is supplied to the communications cable 20a. If the host mode is selected and the connection of the communications cable 20b to the slave connector 13 has been detected, then the control section 3 issues a warning signal to the display section 7 and provides control in such a way that power is not supplied to the communications cable 20b.

When the control section 3 has started supply of power to the communications cable 20a in the host mode, it allows image data to be displayed on the display section 7, and starts communications with the equipment connected through the host connector 12. If a communications cable 20 is connected to the slave connector 13 while power is fed to the communications cable 20a through the host connector 12, then the control section 3 checks whether or not communications are exchanged with the equipment connected through the host connector 12. If there is no communication, the control section 3 suspends supply of power to the communications cable 20a. If there is communication, the control section 3 checks if the communication has terminated or not. If the communication has terminated, the control section 3 stops supply of power to the communications cable 20a, and exchanges communications with the equipment connected through the slave connector 13.

When the slave mode is selected, the control section 3 checks if the communications cable 20b is connected to the slave connector 13 or not. If connection of the slave connector 13 has been detected, the control section 3 provides control in such a way that power is not supplied to the communications cable 20b. When the slave mode is selected and the communications cable 20a has been connected to the host connector 12, the control section 3 issues a warning signal to the display section 7, and provides control in such a way that power is not supplied to the communications cable 20a.

Figure 9:
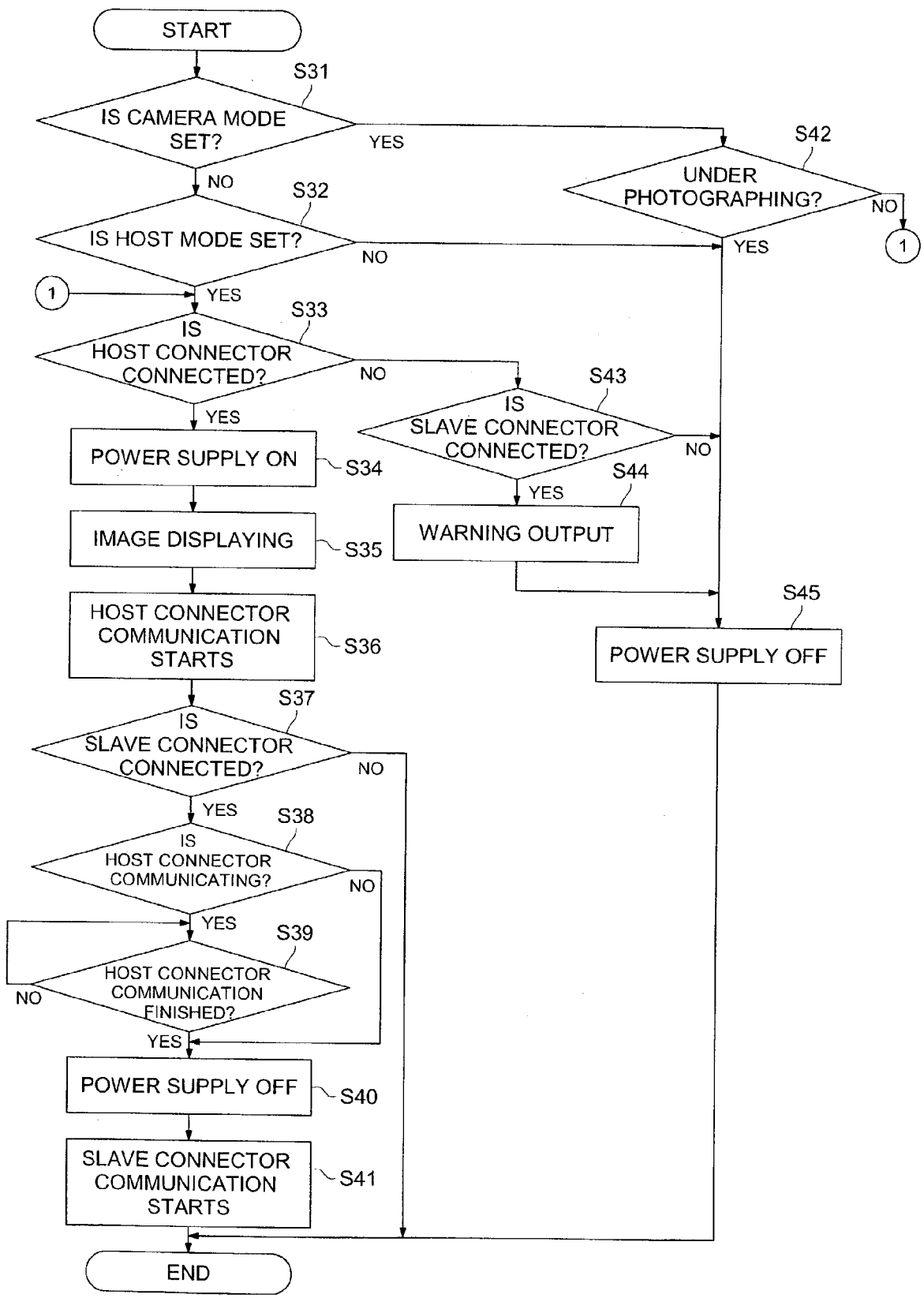
FIG. 9 is a flow chart representing power supply processing 3 carried out by a control section 3 in the third embodiment.

The following describes the operation in the third embodiment:

FIG. 9 is a flow chart representing power supply processing 3 carried out by the control section 3 of a digital camera 300. As shown in FIG. 9, the control section 3 checks whether or not the camera mode is selected by the selector switch 6aa (Step S31). If the camera mode is selected (Step S31; YES), it checks whether or not photographing operation is currently performed (Step 42). If the photographing operation is currently performed, the control section 3 provides control in such a way that power is not supplied to the communications cable 20 (Step 45), and terminates processing of power supply 3. If the camera mode is not selected (Step S42; NO), for example, if processing of image data display is going on, the system proceeds to Step S33.

If the camera mode is not selected by the selector switch 6b (Step 31; NO), the control section 3 checks if the host mode is selected or not (Step S32). If the host mode is not selected (Step S32; NO), i.e. if the slave mode is selected, the control section 3 provides control in such a way that power is not supplied to the communications cable 20 (Step S45), and terminates the processing of power supply 3.

If the host mode is selected (Step S32; YES), the control section 3 checks if the communications cable 20a is connected to the host connector or not. If the communications cable (USB cable) 20a is not connected to the host connector 12 (Step S33; NO), the control section 3 checks if the communications cable (USB cable) 20b is connected to the slave connector 13 or not (Step S43). If the communications cable 20b is connected to the slave connector 13 (Step S43; YES), the control section 3 issues a warning signal to the display section 7 (Step S44), and at the same time, provides control in such a way that power is not supplied to the communications cable 20b (Step S45), thereby terminating the processing of power supply 3.

When the communications cable 20a is connected to the host connector 12 (Step S33; YES), the control section 3 provides control in such a way that power is not supplied to the communications cable 20a (Step S34), and at the same time, allows image data to be displayed on the display section 7 (Step S35). Further, the control section 3 starts communications with the equipment connected through the host connector 12 (Step S36).

Then the control section 3 checks if the communications cable 20b is connected to the slave connector 13 (Step S37). If the communications cable 20b is connected to the slave connector 13 (Step S37; YES), the control section 3 checks if communications are exchanged with the equipment connected through the host connector 12 (Step S38). If there is no communication, (Step S38; NO), the control section 3 provides control in such a way that power is not supplied to the communications cable 20a (Step 40).

If communications are exchanged with the equipment connected through the host connector 12 (Step S38; YES), the control section 3 checks if the communication has terminated or not (Step S39). If the communication has terminated (Step 39; YES), the control section 3 provides control to stop supply of power to the communications cable 20a (Step S40). The control section 3 allows communications with the equipment connected through the slave connector 13, and terminates the processing of power supply 3.

As described above, according to the third embodiment, the digital camera 300 is provided with a selector switch 6b for selection among the camera mode, host mode and slave mode, a host connector 12 for connection with slave equipment, and a slave connector 12 for connection with host equipment. This permits the mode to be set in conformity to the purpose of use of the digital camera 300. At the same time, when connected with equipment to exchange communications, the equipment is connected through the connector in conformity to the requested function. This arrangement permits power to be supplied to the communications cable 20a only when necessary.

Accordingly, for example when the camera mode is selected by the selector switch 6a or the slave mode is selected, the control section 3 does not allow power to be supplied to the communications cable 20a, thereby eliminating unnecessary power consumption. Power is not supplied when the communications cable 20a is not connected to the host connector 12 even when the host mode is selected, or when there is no communication even when the communications cable 20a is connected. This arrangement reduces power consumption.

A warning signal is displayed on the display section 7 if the communications cable 20b is connected to the slave connector 13 when the host mode is selected, or if communications cable 20a is connected to the host connector 12 when the slave mode is selected. This arrangement calls attention of the user to start immediate communication. When the host mode is selected and power supply to the communications cable 20a has started, image data is displayed on the display section 7. This allows easy checking of the image data to be sent, and permits communication with the connected equipment.

The operation of the digital camera 300 given in the aforementioned processing of power supply 3 shows only an example without being restricted thereto. For example, if the communications cable 20b is connected through the slave connector 13 while power is supplied to the communications cable 20a connected through the host connector 12, supply of power is suspended after confirming the termination of communication with the communications cable 20a. Instead of this arrangement, it is also possible to use the arrangement where supply of power and communication is stopped in the communications cable 20a when the communications cable 20b is connected through the slave connector 13, and to start communication with the communications cable 20b. In other words, priority is given to the case where the digital camera 300 works as a slave, thereby reducing the power consumption of the digital camera 300.

It is also possible to adopt the arrangement where power is not supplied to the communications cable 20a if there is communication going on with the communications cable 20b through the slave connector 13 when the communications cable 20a is connected through the host connector 12. This arrangement does not allow power to be supplied while there is communication with the communications cable 20b even when the communications cable 20a has been connected through the slave connector 13. So it eliminates unnecessary supply of power and minimizes power consumption.

It is also possible to use the arrangement where power is supplied to the host connector 12 when the communications cable 20 is not connected to the host connector 12 or slave connector 13. This approach does not allow the power to be supplied to the slave connector 13 when the communications cable 20 is not connected. Thus, this arrangement eliminates unnecessary power supply and minimizes power consumption.

When the host mode is selected and the communications cable 20a is connected through the host connector 12, power is supplied and the image data is shown on the display section 7. It is also possible to use the arrangement, for example, wherein the displayed image is deleted when the slave mode has been selected by the selector switch 6b. In other words, when the digital camera 300 works as a slave, image data can be displayed on the equipment that works as a host. This approach minimizes the use of display section 7 of the digital camera 300, and saves the drive power of the digital camera 300.

It is also possible to use the arrangement provided with a battery remaining charge detector (not illustrated) to detect the remaining charge of the battery provided on a power source 8; it detects the remaining charge of the battery when a host mode is selected by the selector switch 6b, and a warning is given on the display section 7 if the remaining battery charge is below a predetermined level, thereby ensuring that the digital camera 300 does not work as a host. When the remaining battery chage of the digital camera 300 is insufficient, this arrangement permits priority to be given to the drive processing of the digital camera 300. At the same time, the user is immediately notified of the shortage of battery remaining chage, with the result that the convenience of the user is much improved.

Further, it is apparent that the detailed configuration and operations of the component parts of the digital cameras 100 through 300 in the first through third embodiments can be modified as appropriate without departing from the spirit of the present invention.

EFFECTS OF THE INVENTION

The present invention provides a photographing apparatus that exchanges data communications with peripheral equipment connected via a communications cable and supplies power thereto, wherein, in conformity to the function required by connected peripheral equipment, decision is made to determine whether or not power should be supplied to the communications cable. Only when necessary, power for communication is supplied to the communications cable, thereby reducing the unwanted power consumption and ensuring an effective use of the power source of the photographing apparatus.

What is claimed is:

1. A photographing apparatus capable of data communication with equipment connected to the photographing apparatus via a communication cable and capable of supplying power to the equipment via the communication cable, the photographing apparatus comprising:
    a connecting section for connecting the communication cable;
    a connection detecting section for detecting connection of the communication cable to the connecting section;
    a recognizing section for recognizing that a photographing process is under operation;
    a display controller for controlling an image display on a display section; and
    a power supply controller for controlling power supply to the communication cable, wherein
    when the connection detecting section has detected that the communication cable is connected to the connection section and the recognizing section has recognized that the photographing process is under operation, the power supply controller controls not to supply power to the communication cable, and
    wherein the power supply controller controls to supply power to the communication cable when the recognizing section has recognized that the photographing process is not under operation, and the display controller controls to display an image on the display section when the communication cable has been supplied power.

2. The photographing apparatus of claim 1, wherein while the image is displayed on the display section by the display controller, in cases where the connection detecting section detects that the communication cable is connected to the connecting section, the power supply controller controls to supply power to the communication cable.

3. The photographing apparatus of claim 2, further comprising an input section for inputting an instruction to print, wherein while the image is displayed on the display section and the connection detecting section detects that the communication cable is connected to the connecting section, in cases where the instruction to print the image is inputted by the input section, the power supply controller controls to supply power to the communication cable.

4. A photographing apparatus, capable of data communication with equipment connected to the photographing apparatus via a communication cable and capable of supplying power to the equipment via the communication cable, the photographing apparatus comprising:
    a connecting section for connecting the communication cable;

a setting section for setting a mode by selecting from a mode group comprising at least a camera mode for performing operations related to photographing operation, and a communication mode for performing operations related to data communication with the equipment; and a power supply controller for controlling power supply to the communication cable, wherein when the communication mode has been set by the setting section, the power supply controller controls to supply power to the communication cable, and wherein when the setting section has set a mode other than the communication mode, the power supply controller controls not to supply power to the communication cable.

5. The photographing apparatus of claim 4, wherein when the setting section has set the camera mode, the power supply controller controls not to supply power to the communication cable.

6. A photographing apparatus capable of data communication with equipment connected to the photographing apparatus via a communication cable and capable of supplying power to the equipment via the communication cable, the photographing apparatus comprising:

a connecting section for connecting the communication cable;

a connection detection section for detecting connection of the communication cable to the connecting section, a setting section for setting a mode by selecting from a mode group comprising at least a camera mode for performing operations related to photographing operation, and a communication mode for performing operations related to data communication with the equipment; and a power supply controller for controlling power supply to the communication cable, wherein when the communication mode has been set by the setting section and the connection detection section detects that the communication cable is connected to the connection section, the power supply controller controls to supply power to the communication cable, and wherein the connection detecting section judges which of a host function or a slave function is required, and when communication mode has been set by the setting section and the connection detection section judges that the host function is required, the power supply controller controls to supply power to the communication cable.

7. The photographing apparatus of claim 6, wherein when the communication mode has been set by the setting section and the connection detection section judges that the slave function is required, the power supply controller controls not to supply power to the communication cable.

8. The photographing apparatus of claim 6, further comprises a display controller for controlling an image display on a display section, wherein when the communication mode has been set by the setting section or when the connection detection section judges that the host function is required, the display controller controls to display the image on the display section.

9. The photographing apparatus of claim 8, wherein the connection detecting section judges whether the equipment is a printing apparatus or not, and when the connection detecting section judges that the equipment is the printing apparatus, the display controller controls to display the image on the display section.

10. A photographing apparatus capable of data communication with equipment connected to the photographing apparatus via at least one communication cable, supplying power to the equipment via the at least one communication cable, and further capable of functioning as a host or a slave with respect to the equipment, the photographing apparatus comprising:

a first connecting section for connecting the at least one communication cable when the photographing apparatus functions as the host with respect to the equipment;

a second connecting section for connecting the at least one communication cable when the photographing apparatus functions as the slave with respect to the equipment;

a connection detecting section for detecting connection of the at least one communication cable to each of the first and the second connecting sections; and a power supply controller for controlling power supply to the at least one communication cable, wherein when the connection detecting section detects that the at least one communication cable is connected to the first connecting section, the power supply controller controls to supply power to the at least one communication cable.

11. The photographing apparatus of claim 10, wherein when the connection detecting section detect that the at least one communication cable is not connected to the first connecting section or the second connecting section, the power supply controller controls to supply power to the first connecting section.

12. The photographing apparatus of claim 10, wherein when the connection detecting section detects that the at least one communication cable is connected to the second connecting section, the power supply controller controls to stop supplying power to a second communication cable connected to the first connecting section.

13. The photographing apparatus of claim 10, further comprising, a communication judging section for judging whether communication is conducted or not, via the at least one communication cable connected to the first connecting section or the second connecting section, wherein when the communication judging section judges that communication is not conducted via the at least one communication cable connected to the first connecting section, the power supply controller controls to stop supplying power to the at least one communication cable connected to the first connecting section.

14. The photographing apparatus of claim 10, further comprising:

a communication judging section for judging whether communication is conducted or not, via the at least one communication cable connected to the first connecting section or a second communication cable connected to the second connecting section; and a communication controller for controlling communication via the at least one communication cable and the second communication cable, wherein when the second communication cable is connected to the second connecting section, in cases where the communication judging section judges that the communication is being conducted via the at least one communication cable connected to the first connecting section, the communication controller controls not to start communication via the second communication cable connected to the second connecting section.

15. The photographing apparatus of claim 14, wherein the communication judging section further judges whether communication to be conducted via the at least one communication cable connected to the first connecting section or the second communication cable connected to the second connecting section is finished or not, and when the communication judging section judges that communication conducted via the at least one communication cable connected to the first connecting section is finished, the communication controller controls to start communication via the second communication cable connected to the second communication section.

16. The photographing apparatus of claim 10, further comprising:
a communication judging section for judging whether communication is conducted or not, via the at least one communication cable connected to the first connecting section or a second communication cable connected to the second connecting section; and
a communication controller for controlling communication via the at least one communication cable and the second communication cable,
wherein when the second communication cable is connected to the second connecting section, in cases where the communication judging section judges that the communication is being conducted via the at least one communication cable connected to the first connecting section, the communication controller controls to stop the communication via the at least one communication cable connected to the first connecting section, and to start communication via the second communication cable connected to the second connecting section.

17. The photographing apparatus of claim 10, further comprising a communication judging section for judging whether communication is conducted or not, via the at least one communication cable connected to the first connecting section or a second communication cable connected to the second connecting section,
wherein when the second communication cable is connected to the second connecting section, in cases where the communication judging section judges that the communication is being conducted via the second communication cable connected to the second connecting section, the power supply controller controls not to supply power to the at least one communication cable connected to the first connecting section.

18. The photographing apparatus of claim 10, further comprising a mode selector for selecting and setting a host mode or a slave mode of the photographing apparatus with respect to the equipment.

19. The photographing apparatus of claim 18, further comprising a warning output section for outputting a warning, wherein when the connection detecting section detects that the at least one communication cable is connected to the second connecting section, in cases where the host mode has been set, the warning output section outputs the warning.

20. The photographing apparatus of claim 18, further comprising a display controller for controlling an image display on a display section, wherein when the host mode has been set by the mode selector, the display controller controls to display the image on the display section.

21. The photographing apparatus of claim 20, wherein the display controller controls to erase an image being displayed on the display section when the mode selector switches and sets from the host mode to the slave mode.

22. The photographing apparatus of claim 18, further comprising:
a battery remaining charge detector for detecting remaining charge of a battery; and
a function controller for controlling a function of the photographing apparatus, wherein when the host mode is set by the mode selector, in cases where the remaining charge of the battery detected by the battery remaining charge detector is not more than a predetermined amount, the function controller controls the photographing apparatus not to function as a host.

23. The photographing apparatus of claim 22, further comprising a warning outputting section for outputting a warning, wherein in cases where the function controller controls the photographing apparatus not to function as a host, the warning outputting section outputs the warning.

24. The photographing apparatus of claim 18, further comprising a recognition section for recognizing that the photographing apparatus is under photographing processing, wherein when the recognition section recognizes that the photographing apparatus is under photographing processing, the power supply controller controls not to supply power to the communication cable.

25. A photographing apparatus capable of data communication with equipment connected to the photographing apparatus via a communication cable and capable of supplying power to the equipment via the communication cable, the photographing apparatus comprising:
a connecting section for connecting the communication cable;
a state checking section for detecting a connection of the communication cable to the connecting section, and checking if at least a driver is incorporated in the equipment connected to the photographing apparatus and if the power consumption of the equipment is not less than a predetermined value;
a warning outputting section for outputting a warning, wherein in cases where the state checking section has confirmed that a driver is not incorporated in the equipment, or the power consumption of the equipment is not less than the predetermined value, the warning outputting section outputs the warning; and
a power supply controller for controlling a power supply, wherein after a predetermined time period has elapsed from the time when the warning outputting section output the warning, the power supply controller controls to shut off a drive power supply to the photographing apparatus.

* * * * *